(No Model.)

J. C. FREEMAN.
HARROW.

No. 525,648. Patented Sept. 4, 1894.

Witnesses
G. T. Myers
J. M. Witherow

Inventor
John C. Freeman
By Joseph L. Stevens
Attorney.

UNITED STATES PATENT OFFICE.

JOHN C. FREEMAN, OF RICHMOND, VIRGINIA.

HARROW.

SPECIFICATION forming part of Letters Patent No. 525,648, dated September 4, 1894.

Application filed November 4, 1893. Serial No. 490,026. (No model.)

*To all whom it may concern:*

Be it known that I, JOHN C. FREEMAN, of Richmond, county of Henrico, State of Virginia, have invented certain new and useful Improvements in Harrows, of which the following is a specification, reference being had to the accompanying drawings.

The object of my invention is to produce an improved harrow having an adjustable frame for regulating the depth of the cut, and blades of a peculiar shape adapted to lighten the draft of the machine and to increase its effectiveness.

Figure 1:
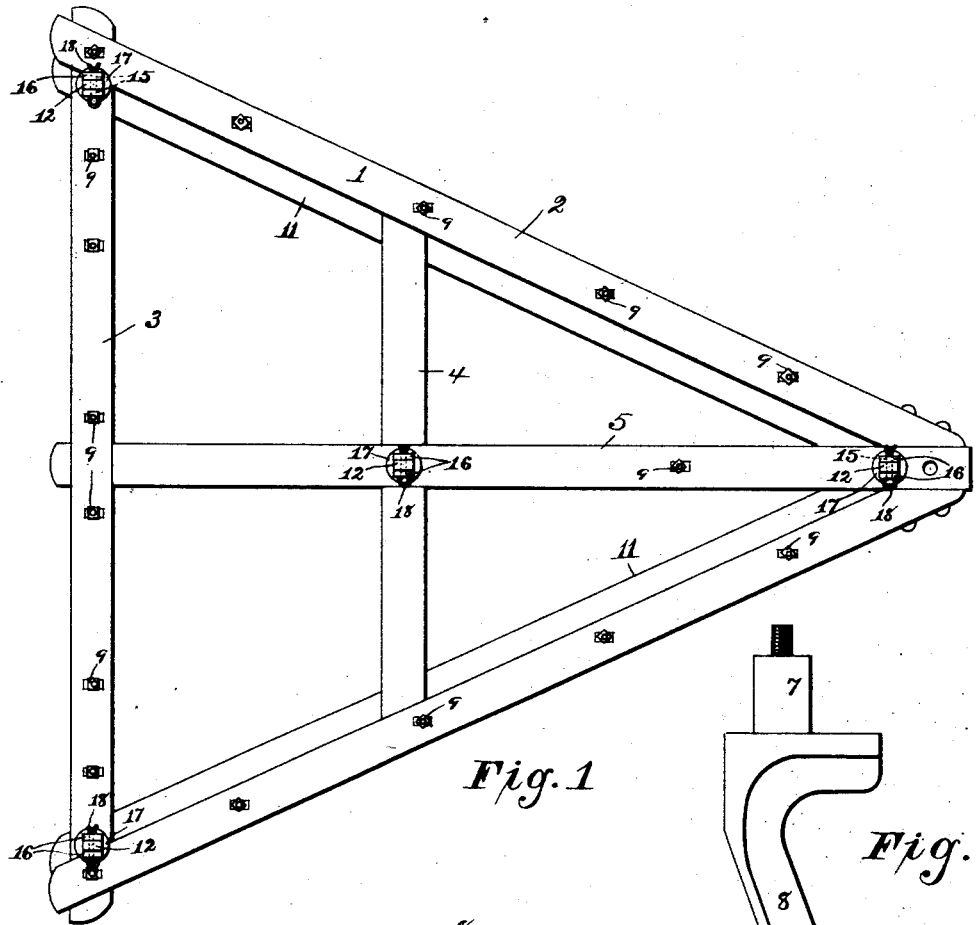
Figure 3:
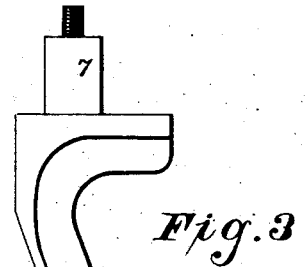
Figure 4:
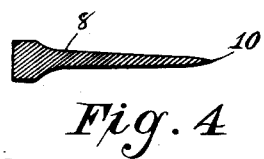
Figure 2:
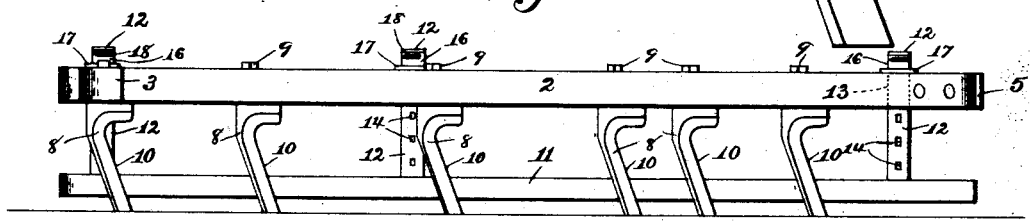

In the accompanying drawings: Figure 1 is a top plan view of my harrow. Fig. 2 is a side elevation thereof. Fig. 3 is a view of one of the blades enlarged. Fig. 4 is a cross section of its blade.

Referring to the figures on the drawings:
1 indicates the frame of a harrow which may be of a general triangular shape, for example, as illustrated. It is preferably composed of oblique side pieces 2, cross pieces 3 and 4, and a longitudinal draft piece 5, it may be called.
Through suitable apertures in the frame is passed the shank 7 of a blade 8. The upper end of the shank is reduced to a screw-threaded end for the reception of a nut 9. By this means the blade may be conveniently replaced. The edge 10 of the blade is angular as illustrated, one angle being inclined downward and forwardly and the other extending substantially horizontally considerably in front of the shank, thereby affording, in practice, a cutting surface which presents itself underneath opposing obstacles in the ground, and which extends in such a direction above the ground as to afford suitable means of cutting such obstructions as are brought to the surface without being severed. The angles of the blade are preferably connected by a curve which enhances the cutting quality of the blade. The lower part of the blade resembles, in cross section, the side elevation of a horse-shoe nail, as shown in Fig. 4 of the drawings. The rectangular rib $10^a$ being connected to the convex contour of the gradually tapering body part $11^a$ by a comparatively abrupt concave surface $12^a$. By this peculiar shape improved facility for sharpening the blade and the requisite strength is gained while the least resistance is opposed to the draft of the implement.

11 indicates a gage frame adjustably carried within the outer rows of blades underneath the harrow frame.

I prefer to employ as a means of adjusting the gage frame upon the harrow frame rods 12 secured to the gage frame and passing through apertures 13 in the harrow frame. At required intervals through the rod I provide apertures 14 through which and through apertures 15 in lugs 16, projecting from a metallic plate 17, cotter keys 18 may be inserted for fixing the adjustment of the harrow frame. The number of rods is determinable by reference to the shape and width of the harrow frame.

What I claim is—

1. A harrow tooth, consisting of a shank, and a blade consisting of two cutting parts, the one substantially horizontal, the other inclining forwardly, said parts of the blade uniting and merging, by means of a curved cutting edge, whereby the material to be severed by the forwardly inclined part of the blade is carried upwardly toward the horizontal part over the curved part and the severing thereof is insured, substantially as set forth.

2. A harrow tooth consisting of a shank and a blade having an enlarged rectangular rear rib and a comparatively thin body part, the sides of which body part are of a compound curved contour, the convex curve of which extends gradually from a point contiguous to the rectangular rib, to the cutting edge, the comparatively abrupt concave contour connecting said rectangular rib and said convex contour, substantially as specified.

In testimony of all which I have hereunto subscribed my name.

JOHN C. FREEMAN.

Witnesses:
B. O. JAMES,
GRENVILLE GAINES.